United States Patent

Konishi

[11] Patent Number: 6,046,820
[45] Date of Patent: Apr. 4, 2000

[54] IMAGE FORMING DEVICE AND COMPUTER WHICH SHARE THE GENERATION OF A FUNCTION FOR CORRECTING IMAGE DATA BASED ON AN IMAGE FORMING CONDITION OF THE IMAGE FORMING DEVICE

[75] Inventor: Jun Konishi, Yokohama, Japan

[73] Assignee: Canon Kabushiki Kaisha, Tokyo, Japan

[21] Appl. No.: 08/954,931

[22] Filed: Oct. 22, 1997

[30] Foreign Application Priority Data

Oct. 22, 1996 [JP] Japan .................................. 8-279428
Sep. 11, 1997 [JP] Japan .................................. 9-246737

[51] Int. Cl.$^7$ .................................................. G06K 15/00
[52] U.S. Cl. ........................................... 358/1.9; 358/1.13
[58] Field of Search ..................................... 345/101, 106, 345/109, 114; 358/401, 406, 447, 448, 455, 456, 458, 461, 504, 518, 534, 1.1, 1.6, 1.9, 1.13, 1.15; 399/9, 15, 38, 53, 60, 72; 347/19, 188, 118

[56] References Cited

U.S. PATENT DOCUMENTS 4,710,785 12/1987 Mills ..................................... 346/153.1
5,313,291 5/1994 Appel et al. ............................. 358/501
5,378,563 1/1995 Ito ............................................. 430/30
5,734,407 3/1998 Yamada et al. ......................... 347/133
5,835,235 11/1998 Goto et al. .............................. 358/406
5,838,342 11/1998 Takahashi et al. ....................... 347/19

FOREIGN PATENT DOCUMENTS

0651317 5/1995 European Pat. Off. .......... G06F 3/12
0679016 10/1995 European Pat. Off. ....... H04N 1/407
0721279 7/1996 European Pat. Off. ....... H04N 1/405

Primary Examiner—Arthur G. Evans
Attorney, Agent, or Firm—Fitzpatrick, Cella, Harper & Scinto

[57] ABSTRACT

A printer sends a calibration request to a computer upon sensing the need for calibration. Upon receiving the calibration request, the computer supplies the printer with data (logical density values) for a grayscale correction. On the basis of the grayscale correction data, the printer forms a sample image, measures the density (actual density values) of the sample image and notifies the computer of the actual density values. On the basis of the logical density values and actual density values, the computer creates a grayscale correction table (executes calibration) serving as a rule for correcting the tonality of image information. When printing is performed, the computer corrects the tonality of the image information based upon the grayscale correction table and supplies the corrected results to the printer.

13 Claims, 8 Drawing Sheets

FIRST GRAYSCALE CORRECTION TABLE

| LOGICAL DENSITY VALUES (GRAYSCALE CORRECTION DATA) | ACTUAL DENSITY VALUES OF SAMPLE IMAGE | DENSITY CORRECTION VALUES |
|---|---|---|
| 10% | D1 | 10/D1 |
| 20% | D2 | 20/D2 |
| 30% | D3 | 30/D3 |
| 40% | D4 | 40/D4 |
| 50% | D5 | 50/D5 |
| 60% | D6 | 60/D6 |
| 70% | D7 | 70/D7 |
| 80% | D8 | 80/D8 |
| 90% | D9 | 90/D9 |
| 100% | D10 | 100/D10 |

FIG. 4

SECOND GRAYSCALE CORRECTION TABLE

| LOGICAL GRAYSCALE VALUES (INPUT GRAYSCALE VALUES TO DATA PROCESSOR) | GRAYSCALE CORRECTION VALUES (OUTPUT DENSITY VALUES TO PRINTER) |
|---|---|
| 0 | 0 |
| 1 | (10/D1)/26 |
| 2 | (10/D1)/26 × 2 |
| 3 | (10/D1)/26 × 3 |
| 4 | (10/D1)/26 × 4 |
| 5 | (10/D1)/26 × 5 |
| • | • |
| 26 | 10/D1 |
| • | • |
| 51 | 20/D2 |
| • | • |
| • | • |
| • | • |
| 230 | 90/D9 |
| • | • |
| 255 | 100/D10 |

IMAGE FORMING DEVICE AND COMPUTER WHICH SHARE THE GENERATION OF A FUNCTION FOR CORRECTING IMAGE DATA BASED ON AN IMAGE FORMING CONDITION OF THE IMAGE FORMING DEVICE

BACKGROUND OF THE INVENTION

This invention relates to an information processing apparatus, an image output apparatus, a method of controlling the same and an image forming system which includes these apparatus.

Printers such as laser printers and ink-jet printers (or bubble-jet printers) are now in wide use. A laser printer forms an image by forming a toner image and fixing the toner image on a recording medium, and an ink-jet printer forms an image by jetting ink onto a recording medium.

The processes and mechanisms for forming an image in these printers typified by the foregoing are rapidly becoming increasingly complicated as the images output thereby are produced at higher resolutions and in color. For example, higher resolutions and colorization are accompanied by degradation of the output image owing to a change in environment and consumption of components (e.g. toner). To compensate for this, calibration mechanisms are employed.

The conventional calibration mechanism is provided on the printer side. However, the information processing capability of the printer is inferior to that of a computer and it is becoming increasing difficult for the printer to satisfy the recent demand for higher quality images. Further, incorporating the entire calibration mechanism in the printer is a cause of higher printer cost.

SUMMARY OF THE INVENTION

Accordingly, an object of the present invention is to divide the function for correcting the image quality of an output image between the image processing apparatus and the image output apparatus.

According to the present invention, the foregoing object is attained by providing an information processing apparatus for supplying image information to an image output apparatus and causing the image output apparatus to form an image, comprising: acquisition means for acquiring actually measured density values of a sample image formed by the image output apparatus; and creation means for creating a correction rule, which is for correcting density of the image information, based upon the actually measured density values acquired from the acquisition means.

Further, according to the present invention, the foregoing object is attained by providing an image output system comprising an information processing apparatus and an image output apparatus connected together, the image output apparatus comprising: image forming means for forming an image based upon image information supplied by the information processing apparatus; control means for causing the image forming means to form a sample image; and measurement means for measuring density of the sample image formed; and the information processing apparatus comprises: acquisition means for acquiring actually measured density values of the sample image, which has been formed by the image output apparatus, from the image output apparatus; creation means for creating a correction rule, which is for correcting density of the image information, based upon the actually measured density values acquired from the acquisition means; and supply means for supplying the image information to the image output apparatus; wherein density of the image information is corrected by the image output apparatus or the information processing apparatus based upon the correction rule, whereby an output density characteristic of the image forming means is appropriately corrected.

Further, according to the present invention, the foregoing object is attained by providing an image output apparatus having means for connecting the image output apparatus to an information processing apparatus via a communication network, comprising: image forming means for forming an image based upon image information supplied by the information processing apparatus; control means for causing the image forming means to form a sample image based upon information concerning formation of the sample image supplied by the image processing apparatus; measurement means for measuring the sample image formed; and transmitting means for transmitting the measured value of the sample image to the information processing apparatus.

Further, according to the present invention, the foregoing object is attained by providing a method of controlling an image otput apparatus having image forming means for forming an image based upon image information supplied by an information processing apparatus via a communication network, comprising: controlling step of causing the image forming means to form a sample image based upon the information concerning formation of the sample image supplied by the image processing apparatus; a measurement step measuring the sample image formed; and a transfer step of transferring the measured value of the sample image to the information procdessing apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the accompanying drawings.

Figure 1:
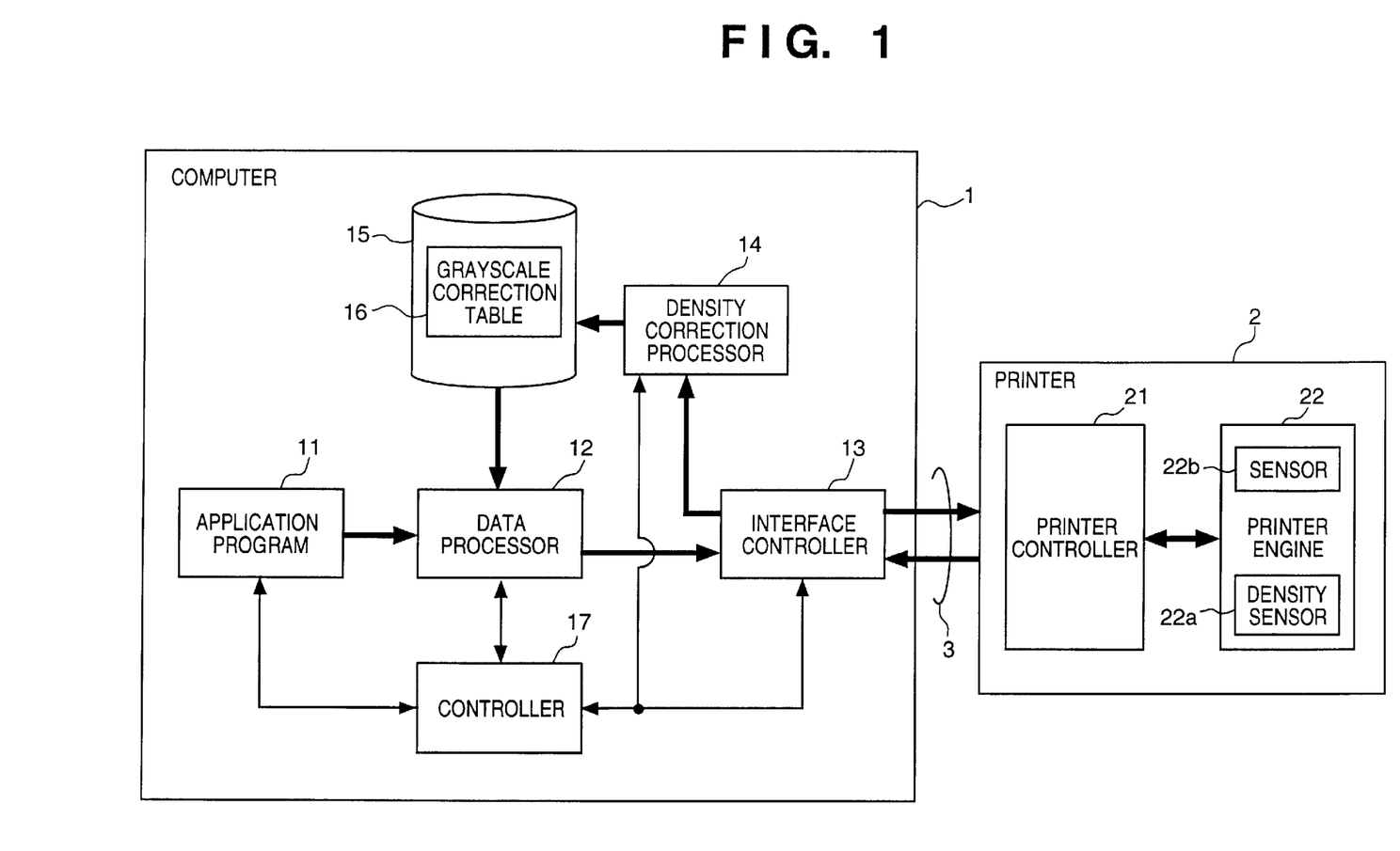
FIG. 1 is a block diagram illustrating the construction of a printer system according to an embodiment of the present invention.

FIG. 1 is a block diagram illustrating the construction of a printer system according to an embodiment of the present invention. The printer system comprises a computer 1, which is typified by a personal computer, and a printer 2 connected by a bidirectional interface 3.

The computer 1 creates a document (which may include figures and tables, etc.) file, produces print data in, say, a page description language, based upon this document file, and sends the print data to the printer 2. A computer 1 executes calibration in response to a calibration request from the printer 2. Calibration in this embodiment is achieved by correcting, in dependence upon the status of the printer 2 when print data is produced, a grayscale correction table which is used to convert a logical grayscale value to an appropriate grayscale value conforming to the status of the printer 2.

An application program 11 is software for creating a document file. For example, if the operating system of the computer 1 is the Windows operating system, the application program 11 would include a GDI.

On the basis of a document file supplied by the application 11, a data processor 12 produces print data to be sent to the printer 2. At this time the data processor 12 refers to a grayscale correction table 16, which has been stored on a storage medium 15, to convert a logical grayscale value specified in the document file to an appropriate grayscale value.

An interface controller 13 controls an exchange of data with the printer 2. The interface controller 13 transmits the print data produced in the data processor 12 to the printer 2, receives a calibration request from the printer 2 and receives data related to calibration from the printer 2.

A density correction processor 14 responds to the calibration request by creating the grayscale correction table 16 based upon an actual density value acquired from the printer 2 (the actual density value is density obtained by forming a sample image in the printer 2 and measuring the sample image) and storing the grayscale correction table 16 on the storage medium 15. The latter ideally is constituted by e.g. a hard disk, SRAM or DRAM, etc.

The printer 2 has a printer controller 21 and a printer engine 22. The printer controller 21 receives print data sent from the computer 1, converts the print data to bitmap data and supplies the bitmap data to the printer engine 22, where the image is formed on the recording medium (e.g. recording paper). Further, the printer controller 21 senses an environmental change (e.g. a change in temperature) and consumption of components (e.g. a decline in amount of remaining toner), and issues a calibration request to the computer 1 if a fluctuation in the sensed value is large enough to require calibration. On the basis of grayscale correction data (logical density values) supplied by the computer 1 in response to the calibration request, the printer controller 21 forms a sample image and sends the computer 1 the result (actual density values) of measuring the density of the sample image.

Figure 2:
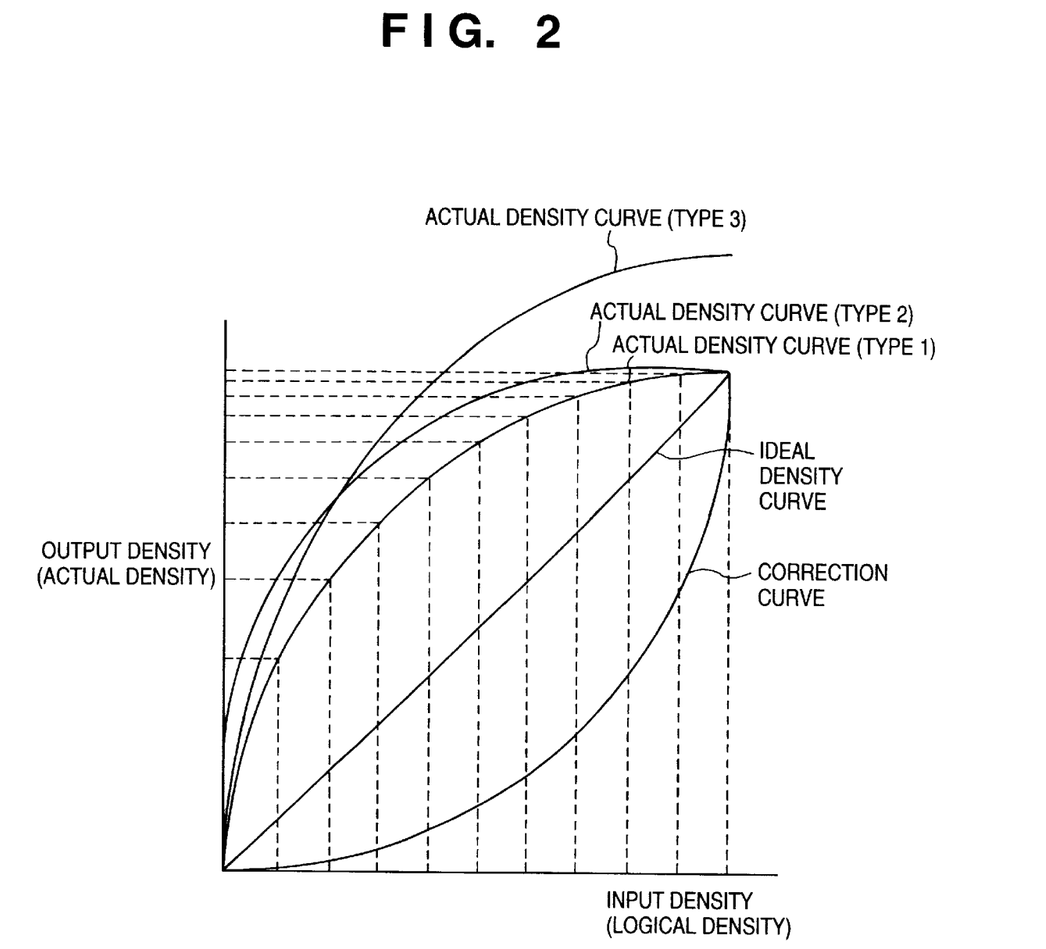
FIG. 2 is a graph showing an example of the relationship between an input density value (logical density value) and an output density value (actual density value) in a printer.

FIG. 2 is a graph showing an example of the relationship between an input density value (logical density value) and output density value (actual density value) in the printer 2.

Ordinarily, a logical density value specified in a document file produced in a computer and an actual density value representing the actual density of an image formed by the printer do not agree and it is required, therefore, that the logical density value be subjected to a suitable correction. The amount of this correction increases depending upon the status of the printer engine, e.g. a change in the environment.

An actual density curve indicating the relationship between input density (logical density) and actual density differs depending upon the type of printer as a matter of course but also differs depending upon the environment of use and conditions of use even for one and the same printer.

Three types (Types 1~3) of actual density curves are shown in FIG. 2 for reference purposes. Density that has not undergone a grayscale correction in the data processor 12, namely logical density, is plotted along the horizontal axis. Density of the output image corresponding to the logical density, namely the actual density, is plotted along the vertical axis.

In this example, the actual density curves are convex and the intermediate density portions of the curves tend to represent a darker density than that intended. In order to obtain an output image having an ideal characteristic (a linear density characteristic), which is indicated by the ideal density curve shown in FIG. 2, from the printer 2 having the convex characteristic, it is required that the logical density be corrected by a concave correction curve. It should be noted that the illustrated correction curve is one that corresponds to the actual density curve of Type 1.

The computer 1 generates grayscale correction data of predetermined logical densities (e.g. 10, 20, 30 . . . 100%) in dependence upon the calibration request from the printer 2 and supplies this data to the printer 2. The printer 2 forms a sample image based upon the grayscale correction data and measures the density of the sample image by a density sensor 22a, whereby actual density can be obtained. By acquiring the actual density from the printer 2, the computer 1 is capable of creating the grayscale correction table 16 having a conversion rule of the kind indicated by "correction curve" in FIG. 2, by way of example. It should be noted that formation of the sample image and measurement of density in the printer 2 may be performed by actually forming the sample image on the recording medium (e.g. recording paper) and measuring the density of this image. In an electrophotographic printer, for example, the sample image may be formed on a photosensitive drum and the density of the sample image on the photosensitive drum may be measured.

In this embodiment, the creation of the grayscale correction table in the density correction processor 14 is performed by processing in two stages. Specifically, the density correction processor 14 first establishes correspondence between logical density and actual density in relation to tones included in the sample image and creates a first grayscale correction table (see FIG. 3) for appropriately correcting the logical density. Second, on the basis of the first grayscale correction table, the density correction processor 14 creates a second grayscale correction table (the grayscale correction table 16) (see FIG. 4) produced by interpolating data representing tones not contained in the sample image.

Figure 3:
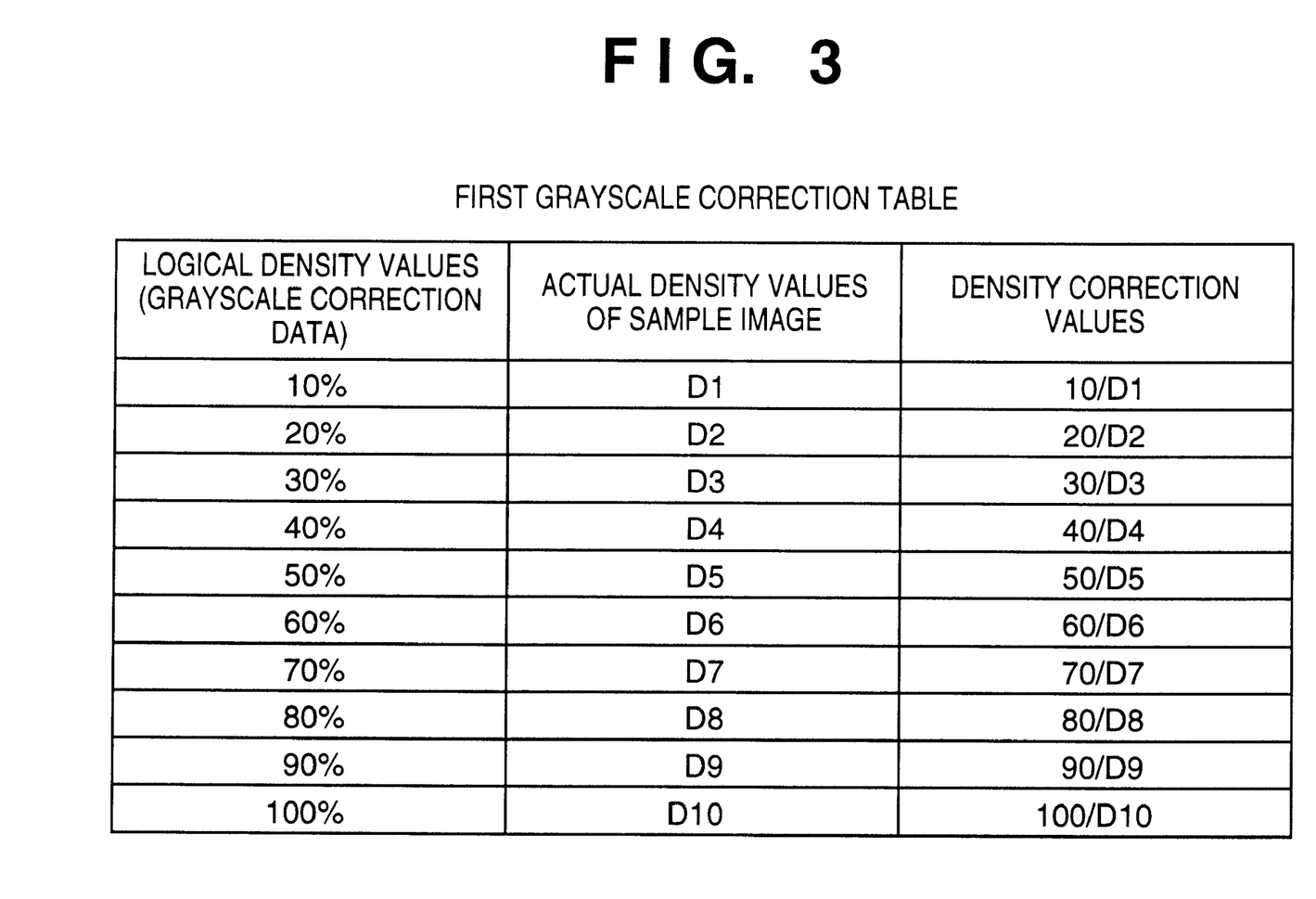
FIG. 3 is a diagram showing an example of a first grayscale correction table.

FIG. 3 is a diagram showing an example of the first grayscale correction table. The leftmost column in FIG. 3 shows logical density values in grayscale correction data produced in the data processor 12 and supplied to the printer 2. In this example, the logical density values are partitioned at increments of 10°/C. over a range of 0 to 100%. The center column in FIG. 3 shows actual density values obtained by measuring the sample image produced by the printer 2 based upon the grayscale correction data. The rightmost column in FIG. 3 shows density correction values obtained by dividing the logical density values by the actual density values.

Figure 4:
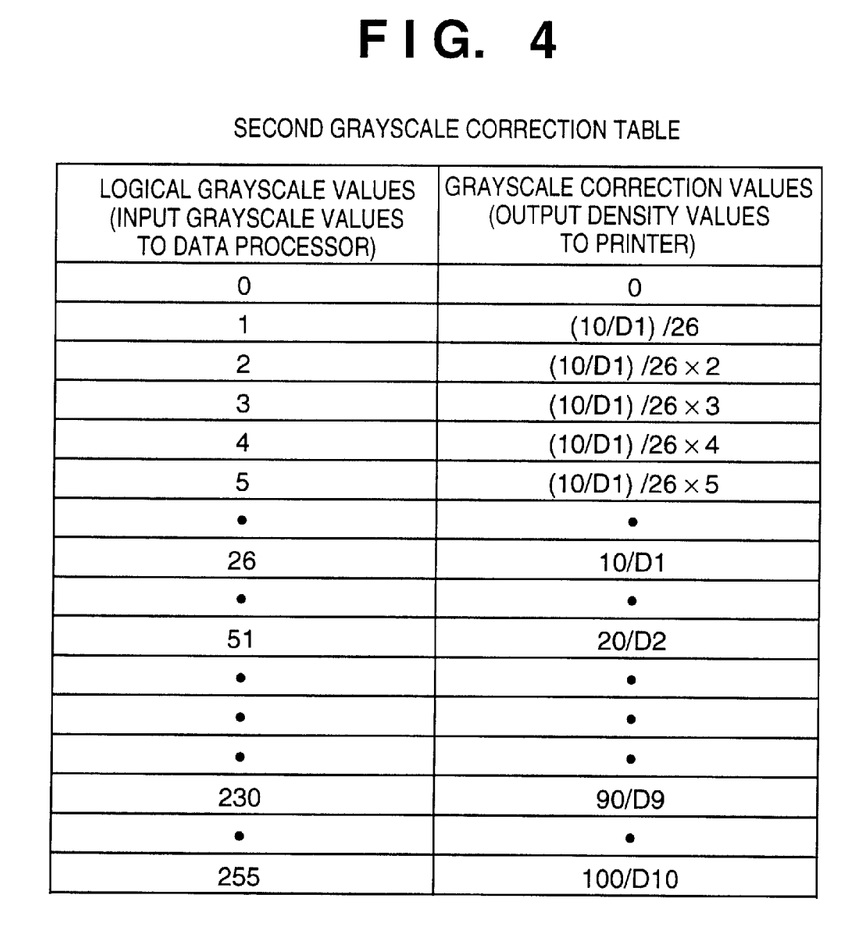
FIG. 4 is a diagram showing an example of a second grayscale correction table.

FIG. 4 is a diagram showing an example of the second grayscale correction table (the grayscale correction table 16). The second grayscale correction table is produced in the density correction processor 14 based upon the first grayscale correction table. The left column in FIG. 4 shows the logical grayscale values in a document file produced by the application program 11. The right column in FIG. 4 shows the output grayscale values corresponding to the entered logical grayscale values, namely the grayscale values in the print data supplied to printer 2.

The second grayscale correction table (grayscale correction table 16) uses the density correction values 10/D1, 20/D2, . . . , 90/D9, 100/D10 in the first grayscale correction table as is in relation to the logical grayscale values 26, 51, . . . , 230, 255 (here the print data supplied to the printer 2 is assumed to have the 256 gray levels of 0 to 255) corresponding to the logical density values 10, 20, . . . , 90, 100% of the first grayscale correction table shown in FIG. 3. With regard to grayscale correction values corresponding to the other logical grayscale values, these are interpolated using the grayscale correction values for the logical grayscale values 26, 51, . . . , 230, 255.

Figure 5:
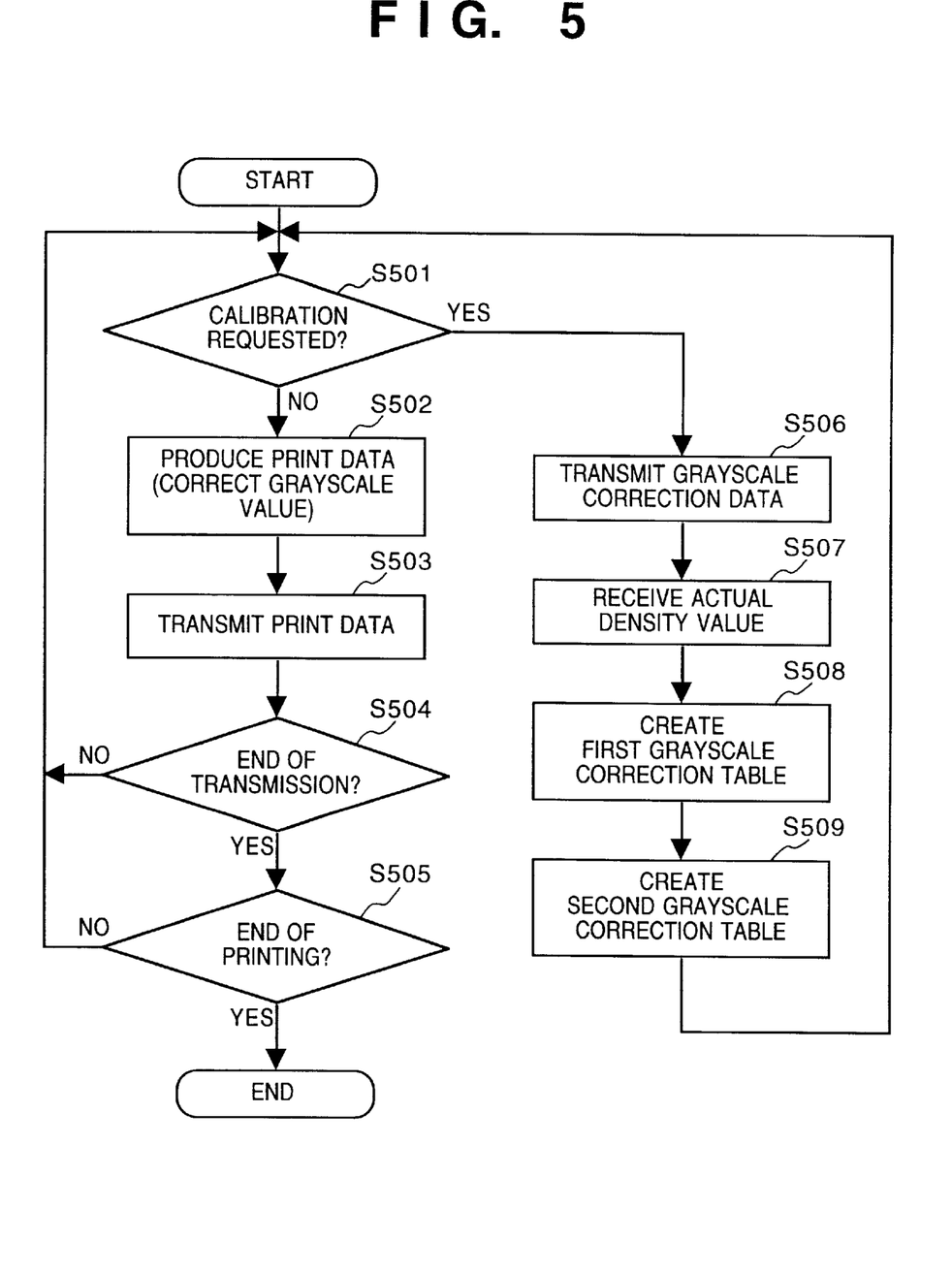
FIG. 5 is a flowchart illustrating an example of a computer operation.

FIG. 5 is a flowchart illustrating an example of operation of the computer 1. The processing indicated by the flowchart of FIG. 5 is controlled by the controller 17 and is started in a case where a print command has been received from the application program 11 or in a case where a calibration request is received from the printer 2.

First, at step S501, the controller 17 determines whether calibration has been requested or not. Examples of methods through which the printer 2 notifies the computer 1 of a calibration request include sending the computer 1 a predetermined command (e.g. a calibration request command) or providing the communication cable 3 with a special signal line and giving notification of the request by the signal level of this signal line, etc.

The program proceeds to step S506 if a calibration request has been recognized at step S501 and to step S502 if a calibration request is not recognized (if printing has not yet been completed).

Grayscale correction data is sent to the printer 2 at step S506. The printer 2 forms a sample image based upon the grayscale correction data, measures the density of the sample image by the density sensor 22a and notifies the computer 1 of the result (actual density value). It should be noted that transmission of actual density values may simply be requested without sending grayscale correction data to the printer 2 at step S506. In such case, however, it would be necessary for the computer 1 to recognize the logical density value, which corresponds to the density value of the sample image formed by the printer, as by receiving the logical density value along with the actual density value at step S507.

The actual density value is received from the computer 1 at step S507. This followed by step S508, at which the first grayscale correction table is produced by the grayscale correction processor 14 based upon the actual density value received, and then by step S509, at which the second grayscale correction table (grayscale correction table 16) is produced by the grayscale correction processor 14 using the first grayscale correction table.

In a case where it is necessary to generate and transmit print data ("NO" at step S501), the print data is produced at step S502 by the data processor 12 while the data processor 12 corrects the logical grayscale value to the appropriate grayscale value by referring to the second grayscale correction table (grayscale correction table 16) on the basis of the document file supplied from the application program 11.

The print data produced is transmitted to the printer 2 via the interface controller 13 at step S503.

It is determined at step S504 whether transmission of print data per unit (e.g. page unit) has been completed. The program proceeds to step S505 if transmission has been completed and returns to step S501 if transmission has not been completed.

It is determined at step S505 whether printing specified by the application program 11 has been completed. If printing has been completed, the processing indicated by this flowchart is terminated; otherwise, the program returns to step S501.

Though the above-described processing corrects tone on the side of the computer 1, the processing may be performed on the side of the computer 2. In such case, after the second grayscale correction table is created at step S509, the information relating to this table would be transferred to the printer 2, the information would be stored in memory means (not shown) in the printer controller 21, and the information would be referred to at the time of printing.

Figure 6:
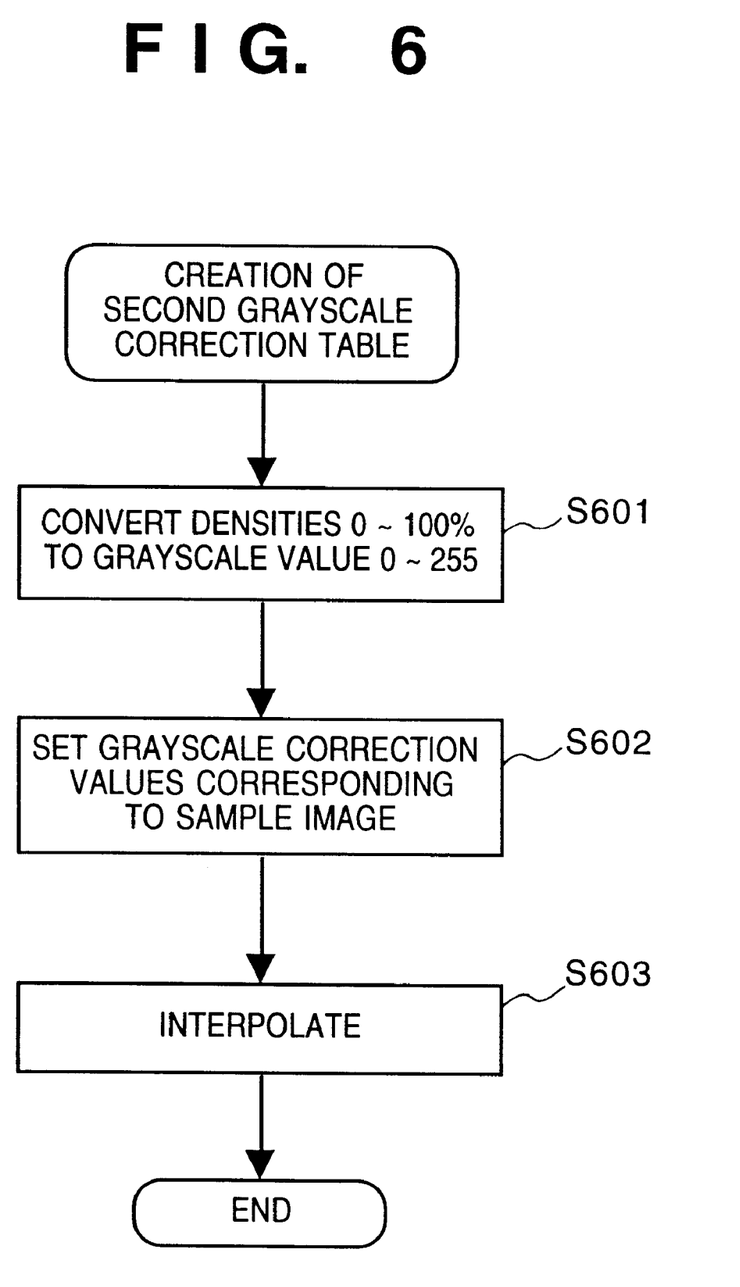
FIG. 6 is a flowchart illustrating a specific example of processing for creating a second grayscale correction table.

FIG. 6 is a flowchart illustrating a specific example of the processing (step S509) for creating the second grayscale correction table (grayscale correction table 16).

At step S601, the logical density values 10, 20, . . . , 100% in the first grayscale correction table (see FIG. 3) are converted to the logical grayscale values of 0~255. More specifically, a logical grayscale value K corresponding to a logical density value in the first grayscale correction table can be obtained in accordance with the formula K=(logical density value) ×255/100.

Next, at step S602, the density correction values (10/D1, 20/D2, . . . , 90/D9, 100/D10) in the first grayscale correction table are adopted as the grayscale correction values for the logical grayscale values corresponding to the logical density values. The accuracy of a grayscale correction value set here is based upon the actual density value actually measured in the printer 2.

This is followed by step S603, at which missing portions, namely grayscale correction values (e.g. 1~25, 27~50) relating to density for which a sample image has not been formed and density not measured, are interpolated. For example, a grayscale correction value H corresponding to the logical grayscale value K can be calculated from the following equation:

$$H=[(H2-H1)/(K2-K1)]\times(K-K1)$$

where H1 represents an already known grayscale correction value (set at step S602) nearest to but smaller than K, H2 represents an already known grayscale correction value nearest to but larger than K, and K1, K2 represent logical density values corresponding to H1 and H2, respectively.

Figure 7:
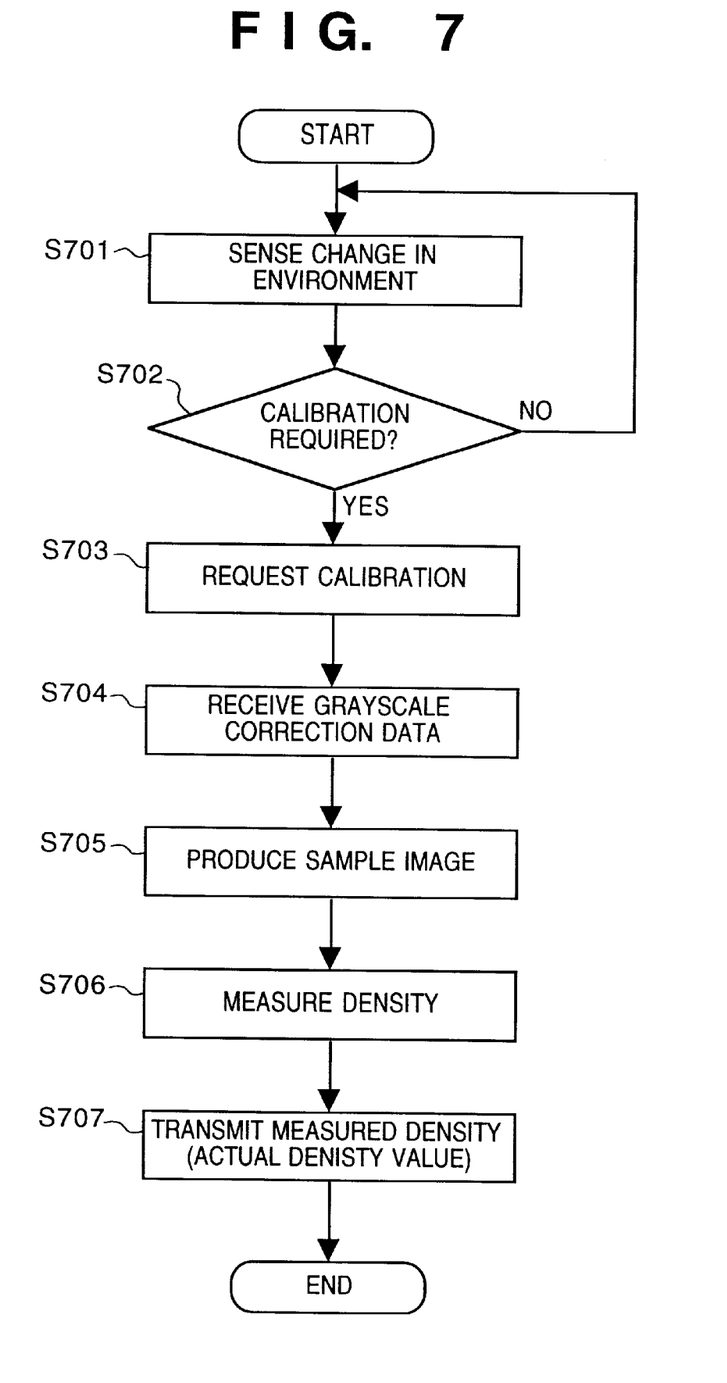
FIG. 7 is a flowchart illustrating an example of a printer operation relating to calibration.

The operation of the printer 2 corresponding to the above-described operation will now be described. FIG. 7 is a flowchart illustrating an example of the calibration-related operation of the printer 2. The processing indicated by this flowchart is controlled by the printer controller 21.

First, at step S701, a change in environment (e.g., a change in temperature or a decline in amount of remaining toner), which is a factor that makes calibration necessary, is sensed by the sensor 22b. It is then determined at step S702 whether the change in environment is of such a degree that would require calibration. (For example, the amount of change in environment is compared with a preset value.) The program proceeds to step S703 if it is determined that calibration is required and returns to step S701 if it is determined that calibration is not required.

This is followed by step S703, at which a calibration request is sent to the computer 1 (in response to which the processing shown in the flowchart of FIG. 5 is started), and then by step S704, at which the grayscale correction data is received from the computer 1 (this corresponds to step S506). Next, at step S705, a sample image is formed based upon the grayscale correction data.

The density of the sample image formed is measured by the density sensor 22a at step S706, after which the measured density is transmitted to the computer 1 as an actual density value at step S707 (which corresponds to step S507).

By virtue of the above-described processing, the grayscale correction table 16 is updated on the side of computer 1, thereby completing the calibration operation.

<Other Embodiments>

According to the embodiment described above, actual density values for logical density values divided into ten equal intervals are acquired from the printer 2 and grayscale correction values of portions not actually measured are determined by linear interpolation processing. However, this is nothing more than one embodiment of the present invention.

By way of example, in another possible embodiment, grayscale correction values of portions not actually measured may be determined by interpolation processing that is based upon a curve. Interpolation processing in this case may employ a Bézier curve, quadratic curve or cubic curve.

Further, by way of example, an arrangement may be adopted in which grayscale correction tables of a plurality of types are registered in the computer 1 in advance and any one of these grayscale correction tables is selected based upon an actual density value acquired from the printer 2. An effective method for use in this case includes obtaining one or several grayscale correction values corresponding to an acquired actual density value, comparing this grayscale correction value with a corresponding grayscale correction value in the grayscale correction tables prepared beforehand, and selecting the grayscale correction table for which the difference between the two values is smallest.

Further, the number or values of logical density values which prevail when a sample image is formed can be selected at will in dependence upon the characteristics of the printer, user preference, etc.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Figure 8:
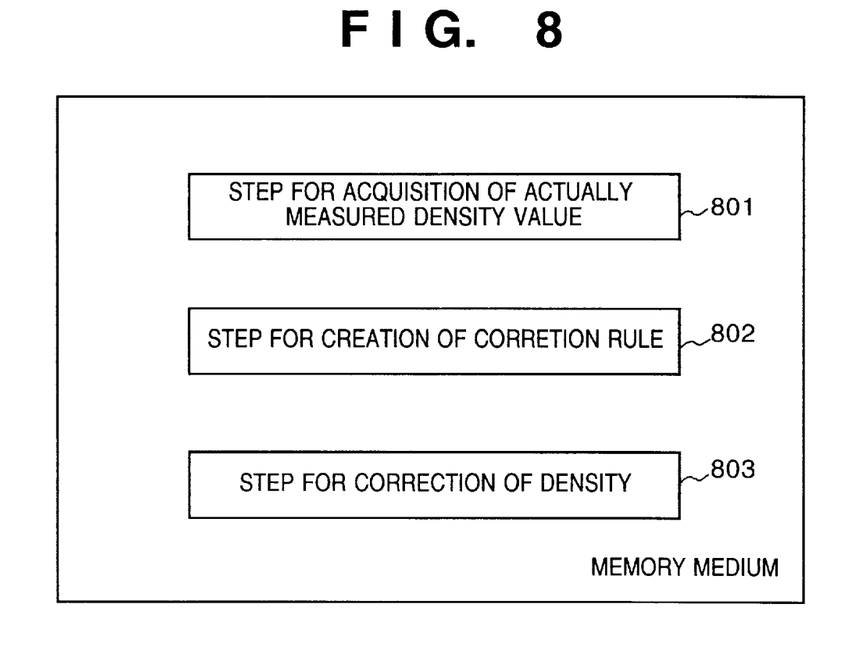
FIG. 8 is a diagram showing an example of a memory medium storing program codes for implementing computer functions by software.

FIG. 8 is a diagram showing an example of a memory medium storing program codes for implementing functions of the computer 1 by software. A code 801 of a step for acquiring an actually measured density value corresponds to step S507, by way of example. A code 802 of a step for creating a correction rule corresponds to e.g. steps S508 and S509. A code 803 of a step for correcting the density of image information corresponds to e.g. step S509, the data processor 12 and the density correction table 16, etc.

Figure 9:
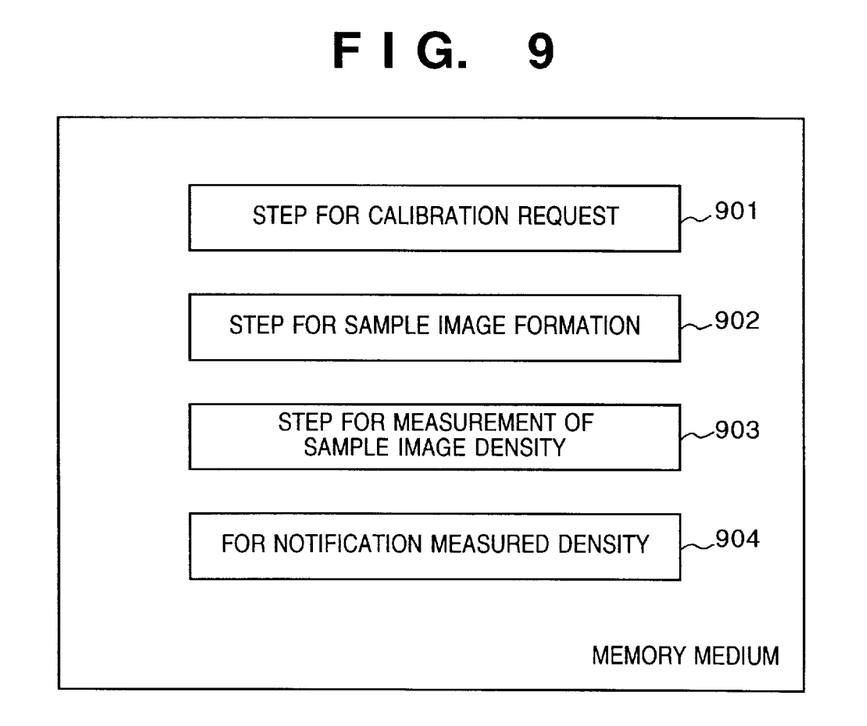
FIG. 9 is a diagram showing an example of a memory medium storing program codes for implementing control of a printer by software.

FIG. 9 is a diagram showing an example of a memory medium storing program codes for implementing functions of the printer 2 by software. The printer 2 can be controlled by causing a CPU (not shown) within the printer controller 21 to operate based upon the program codes stored on this memory medium.

A code 901 of a calibration request step corresponds to e.g. steps S701 and S702, a code 902 of a sample image formation step corresponds to e.g. steps S704 and S705, a code 903 of a step for measuring the density of a sample image corresponds to e.g. step S706, and a code 904 of a notification step for notifying the computer 1 of the measured density of the sample image corresponds to e.g. step S707.

Thus, in accordance with the present invention, the function for correcting the image quality of an output image is distributed between an image processing apparatus and an image output apparatus. As a result, the processing capability of the information processing apparatus can be utilized effectively. In addition, the functions of the image output apparatus can be simplified.

The present invention is not limited to the above embodiments and various changes and modifications can be made within the spirit and scope of the present invention. Therefore, to apprise the public of the scope of the present invention, the following claims are made.

What is claimed is:

1. An image output system comprising a host computer and a printer having a printer engine and a printer controller, said host computer and said printer being connected via a communication network, said printer comprising:

sensing means for sensing a change in environment;

calibration request transmission means for transmitting a calibration request to said host computer in accordance with the sensed result;

reception means for receiving sample image data from said host computer;

sample image forming means for forming a sample image based on the received sample image data;

measurement means for performing a measurement on the formed sample image; and measured data transmission means for transmitting the measured data to said host computer; and said host computer comprising;

calibration request reception means for receiving the calibration request from said printer;

sample image data transmitting means for transmitting the sample image data to said printer;

measured data reception means for receiving the measured data from said printer; and generating means for generating grayscale correction data based on the received measured data.

2. A printer having a printer engine and a printer controller, to be connected to a host computer calibrating grayscale correction data; said printer comprising:

sensing means for sensing a change in environment;

calibration request transmission means for transmitting a calibration request to said host computer in accordance with the sensed result;

reception means for receiving sample image data from said computer;

sample image forming means for forming a sample image based on the received sample image data;

measurement means for performing measurement on the formed sample image; and measured data transmission means for transmitting the measured data to said host computer.

3. The printer according to claim 2, wherein said calibration request transmission means transmits the calibration request to said host computer if an amount of change in the environment has exceeded a predetermined amount.

4. The system according to claim 1, wherein the environment includes temperature or consumption of a component of said printer.

5. The system according to claim 1, wherein said printer adopts an electrophotographic method to form an image, said sample image forming means forms the sample image on a photosensitive drum, and said measurement means performs measurement on the sample image on the photosensitive drum.

6. The system according to claim 1, wherein said host computer further comprises:

correction means for correcting input image data in accordance with the generated grayscale correction data; and image data transmission means for transmitting the corrected image data to said printer.

7. The printer according to claim 2, wherein the environment includes temperature or consumption of a component of said printer.

8. The printer according to claim 2, wherein said printer adopts an electrophotographic method to form an image, said sample image forming means forms the sample image on a photosensitive drum, and said measurement means performs measurement on the sample image on the photosensitive drum.

9. A host computer to be connected to a printer via a communication network, said printer having a printer engine and a printer controller, said host computer comprising:

calibration request reception means for receiving a calibration request transmitted from said printer based on a change in environment in said printer;

sample image data transmitting means for transmitting the sample image data to said printer;

measured data reception means for receiving data from said printer, the data being obtained by performing measurement on a sample image formed in said printer based on the sample image data; and generating means for generating grayscale correction data based on the received data.

10. The host computer according to claim 9, wherein the environment includes temperature or consumption of a component of said printer.

11. The host computer according to claim 9, further comprising:

correction means for correcting input image data in accordance with the generated grayscale correction data; and image data transmission means for transmitting the corrected image data to said printer.

12. A memory medium recording a program implementing an implementing an image processing method applied to a host computer to be connected to a printer via a communication network, the printer having a printer engine and a printer controller, the program comprising:

a calibration request reception step of receiving the calibration request transmitted from the printer based on a change in environment in the printer;

a sample image data transmitting step of transmitting the sample image data to the printer;

a measured data reception step of receiving data from the printer, the data being obtained by performing measurement on a sample image formed in the printer based on the sample image data; and a generating step of generating grayscale correction data based on the received data.

13. A method applied to a host computer to be connected to a printer via a communication network, the printer having a printer engine and a printer controller, the method comprising:

a calibration request reception step of receiving the calibration request transmitted from the printer based on a change in environment in the printer;

a sample image data transmitting step of transmitting the sample image data to the printer;

a measured data reception step of receiving data from the printer, the data being obtained by performing measurement on a sample image formed in the printer based on the sample image data; and a generating step of generating grayscale correction data based on the received data.

* * * * *

UNITED STATES PATENT AND TRADEMARK OFFICE
CERTIFICATE OF CORRECTION

PATENT NO. : 6,046,820
DATED : April 4, 2000
INVENTOR(S) : JUN KONISHI

It is certified that error appears in the above-identified patent and that said Letters Patent is hereby corrected as shown below:

ON THE TITLE PAGE:

[56] References Cited, under U.S. PATENT DOCUMENTS

Insert --5,574,544 11/1996 Yoshino et al.--.

IN THE DRAWINGS:

Sheet 8 of 8, FIG. 8, "CORRETION" should read --CORRECTION--.

COLUMN 1:

Line 31, "increasing" should read --increasingly--.

COLUMN 2:

Line 2,  "apparatus;" should read --apparatus,--;
    Line 23, "otput" should read --output--; and
    Line 32, "procdessing" should read --processing--.

COLUMN 3:

Line 1,  "ablock" should read --a block--.

COLUMN 6:

Line 64, "value.)" should read --value).--.

COLUMN 8:

Line 67, "comprising;" should read --comprising:--.

UNITED STATES PATENT AND TRADEMARK OFFICE
CERTIFICATE OF CORRECTION

PATENT NO. : 6,046,820

DATED : April 4, 2000

INVENTOR(S) : JUN KONISHI

It is certified that error appears in the above-identified patent and that said Letters Patent is hereby corrected as shown below:

COLUMN 10:

Line 23, "an implementing" should be deleted.

Signed and Sealed this

Seventeenth Day of April, 2001

Attest:

NICHOLAS P. GODICI

Attesting Officer     Acting Director of the United States Patent and Trademark Office